Figure 1:
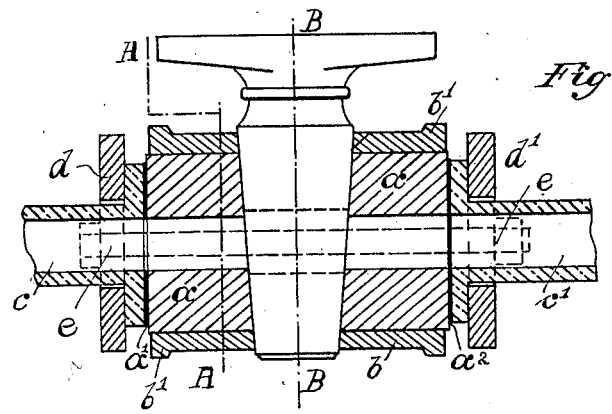

No. 885,526. PATENTED APR. 21, 1908.
C. RUPPEL.
PROTECTED EARTHENWARE COCK.
APPLICATION FILED APR. 4, 1905.

Witnesses
Thos. Howe
Wm. Gillman, Jr.

Inventor
Carl Ruppel
by Foster Freeman & Watson
Attorneys.

UNITED STATES PATENT OFFICE.

CARL RUPPEL, OF HÖCHST-ON-THE-MAIN, GERMANY.

PROTECTED EARTHENWARE COCK.

No. 885,526.          Specification of Letters Patent.          Patented April 21, 1908.

Application filed April 4, 1905. Serial No. 253,798.

*To all whom it may concern:*

Be it known that I, CARL RUPPEL, a subject of the German Emperor, and residing at Höchst-on-the-Main, Germany, have invented certain new and useful Improvements in Protected Earthenware Cocks, of which the following is a specification.

This invention relates to a protected earthenware cock for use with acids, lyes and the like, various forms of construction of such cocks being known. The cock to which this invention relates has considerable advantages over those hitherto known and can be used for different purposes.

The known protected earthenware cocks which are provided at one or more sides of the cock channel with two flanged or shouldered arms for connecting same to the pipe or pipes, all have the disadvantage that the cock when connected to said pipe is to a great extent influenced by the weight thereof and consequent strain and could not for any long period resist the effects of such strain; also the connection between the cock and the pipe or pipes could not be affected in the strong, safe and uniform manner necessary in a good installation. Moreover the connecting or joining surfaces in cocks with such flanged arms were proportionately small so that no durable or safe joint was obtainable and the escape of acid or other fluid between the cock and connecting flange or flanges was inevitable after some time. The mounting of the known cocks was also very impracticable and occupied a long time since the respective flanges of the cock and tubes had to be connected together by a number of screws or bolts.

All the above disadvantages of the hitherto known protected earthenware cocks are removed by the cock to which the present invention relates. This is obtained by constructing the cock of a cylindrical shape, the flange communicating arms being completely dispensed with, and the cock is limited in its length approximately to that necessary for the passage of the plug, so that its construction is particularly compact and the durability and stability of the cock-body is very much increased. Corresponding to the cylindrical shape of the earthenware-body of the cock the surrounding protective casing is also of substantially cylindrical shape. The said protective casing is much more durable since the metal lies more securely and uniformly on the body of the cock than has been the case with the hitherto known cocks provided with flanged connecting arms. The fixing flanges on the cock are also rendered unnecessary by the cylindrical construction employed whereby considerable economy of material is effected as also by the removal of said arms.

The mounting of the present cock is considerably facilitated by providing the fixing-bolts only on one side or end, both the tube-ends to be connected being fixed uniformly and simultaneously. The cock proper is not influenced by the connections since the connecting together of the two tubes is effected only by the fixing-screws and not by the inserted cock. Thus the connection of the cock to the tubes will always be uniform and safe and damage to the cock is obviated to a large extent. Owing to the cylindrical shape of the cock-body a large joining or tightening surface is obtained, and consequently an easier but safer connection between the cock and the tubes, so that the escape of acid or the like is almost completely removed. It is also of great advantage that in the present cock, earthenware can be connected by flanges to earthenware, so that contact of the metal protection with acids or the like is impossible, the present cock being therefore adapted for use with all kinds of acids.

Figure 2:
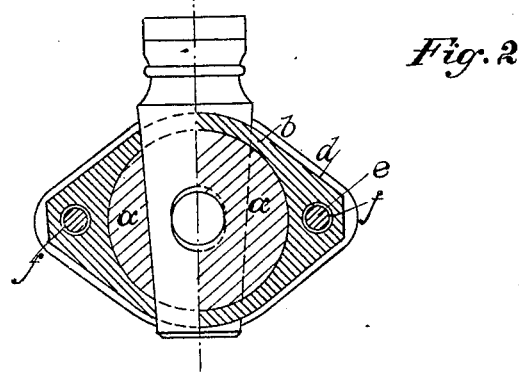
Figure 3:
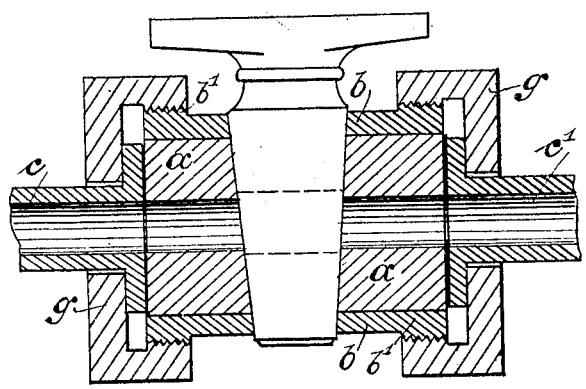

Two forms of constructions of the improved cock are represented in the annexed drawing, Fig. 1 being a longitudinal section of one form of construction and Fig. 2 a cross section thereof one half on the line A—A and the other half on line B—B of Fig. 1; Fig. 3 shows the second form of construction on longitudinal section.

The earthenware cock-body $a$ is cylindrical throughout and surrounded by a metal protector $b$ of approximately the same shape. The two end-surfaces $a^1$ and $a^2$ of the cock-body $a$ serve at the same time as flanges, for connection with the tubes or the like $c$ and $c^1$. In the form shown in Figs. 1 and 2 the fixing of said tubes to the cock-body is effected by means of loose flanges $d$ $d^1$ and bolts $e$ passing through apertures $f$ in lateral reinforcements of the casing $b$. Said lateral reinforcements in which the apertures $f$ are formed extend throughout the length of the cock body. By this means, as shown in Fig. 2, the casing $b$ is relatively thick at opposite sides of the cock thus providing a solid and firm wall for the apertures $f$. The said bolts $e$ are thus protected from any contact with the acids, vapors or the like, so that damage thereto and consequently to the connection of the cock to the respective tubes is prevented.

For preventing the acid which may escape at the upper part of the plug from entering the joints between the cock-body and the tube flanges, the casing $b$ is provided with two surrounding ribs $b^1$.

Instead of the two bolts and corresponding apertures as in the form illustrated a larger number thereof can be arranged according to the dimensions of the cock.

In the form described above experience has shown, especially with cocks of small dimensions, that by unequal screwing up of the bolts $e$ the earthenware-body $a$ is liable to be damaged and the cock therefore rendered useless.

By the somewhat modified form of construction shown in Fig. 3 this inconvenience is completely removed by dispensing with the bolts $e$ and reinforcements on the casing, using nuts or screw caps $g$ screwed on the outer protective casing $b$ for connecting the tubes $c\ c^1$ to the cock. By this means a uniform screwing or fixing must take place under all circumstances, straining being absolutely prevented and damage to the cock rendered impossible.

For receiving the outer nuts or caps, the casing $b$ is provided at both ends with screw threaded ribs $b^1$ replacing the ribs $b^1$ shown in Figs. 1 and 2, and on to said ribs are screwed the nuts $g$ for connecting the tubes $c\ c^1$. The outer surface of the earthenware body $a$ may be provided with grooves or the like for the better connection or adaptation of the protective casing to said body, this connection being also strengthened by the use of the nuts $g$, the casing being pressed into said grooves thereby.

With cocks which are frequently used it is of advantage, where the protection is of soft metal, either to retain the mold which may be in one or two pieces, after filling it with the soft metal, or to provide the cock-body with another protection of hard-metal of the shape of said body, either the mold or the hard-metal protection being provided at both ends with threads.

The cock constructed according to this invention can be used as ordinary discharge or muffle-cock or as a soldering cock without any preparation, which was impossible with the hitherto known earthenware cocks.

I claim:

1. The combination with two pipes, of a cock comprising a cylindrical earthenware body having a passage adapted to communicate with both said pipes, a plug mounted in said body and adapted to control the flow of fluid through said passage, a metal shell surrounding the body of said cock, said shell being increased in thickness throughout its length on opposite sides of the cock, and bolts extending through apertures in said reinforced portions of said casing and connecting the aforesaid pipe sections, substantially as and for the purpose set forth.

2. The combination with two pipes having radial flanges at their adjacent ends, of a cock comprising a cylindrical earthenware body abutting against said radial pipe flanges and having a passage adapted to communicate with both said pipes, a plug mounted in said body and adapted to control the flow of fluid through said passage, a metal shell surrounding the body of said cock, said shell being increased in thickness throughout its length on opposite sides of the cock, rings $d$, $d'$ fitted about said pipes, and bolts extending through apertures in said reinforced portions of said casing and through the rings and connecting the aforesaid pipe sections, substantially as and for the purpose set forth.

3. The combination with two pipes, of a cock comprising a cylindrical earthenware body having a passage adapted to communicate with both pipes, a plug mounted in said body and adapted to control the flow of fluid through said passage, a metal shell surrounding the body of the cock, said shell being increased in thickness throughout its length on opposite sides of the cock and having radial flanges at both ends, and bolts extending through apertures in said reinforced portions of the casing and connecting the pipe sections.

In testimony whereof I have signed my name to this specification in the presence of two subscribing witnesses.

CARL RUPPEL.

Witnesses:
FRANZ HASSLACHER,
ERWIN DIEPPEL.